United States Patent Office 3,258,503
Patented June 28, 1966

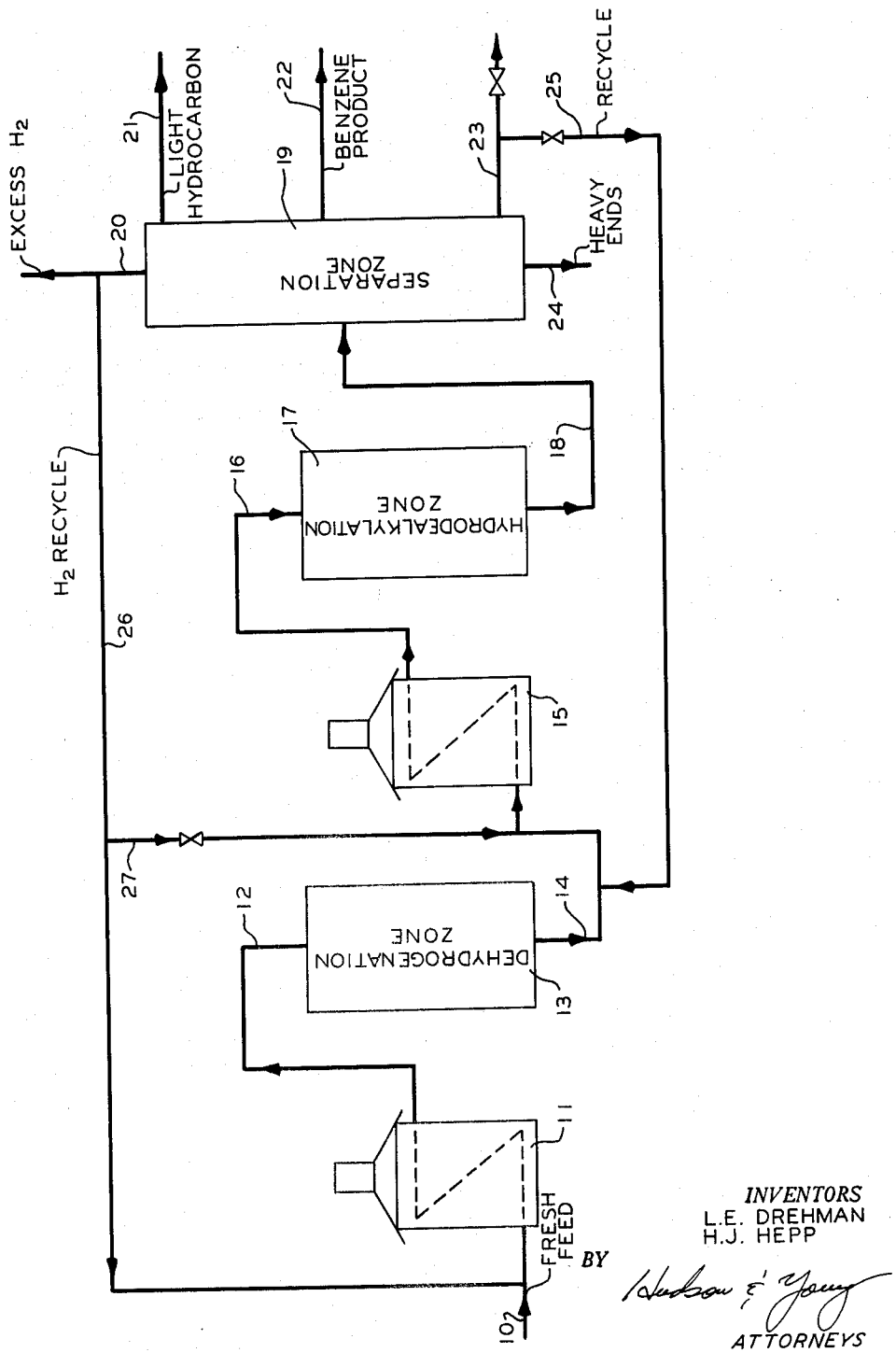

3,258,503
PRODUCTION OF BENZENE
Lewis E. Drehman and Harold J. Hepp, Bartlesville, Okla., assignors to Phillips Petroleum Company, a corporation of Delaware
Filed Aug. 18, 1961, Ser. No. 132,432
3 Claims. (Cl. 260—668)

This invention relates to the production of benzene from naphthenes. In one aspect the invention relates to a novel process for the production of benzene from naphthenes by first catalytically reforming said naphthenes and passing the effluent from the reforming directly to a thermal hydrodealkylation zone without separation of hydrogen therefrom. In another aspect this invention relates to a novel process for the production of benzene from naphthenes by catalytically reforming, passing the effluent from the reforming directly without separation to a thermal hydrodealkylation zone, separating the effluent from the hydrodealkylation step into a hydrogen stream and a benzene stream and recycling a portion of the hydrogen stream to the inlet to the hydrodealkylation step.

Benzene is a well known and commercially important compound having many uses. A unitized and simple process for its production from naphthenes having 6 or more carbon atoms is highly advantageous. Although reforming $C_6$ naphthenes (cyclohexane and methylcyclopentane) produces benzene with no major separation problems, reforming $C_7+$ monocyclic naphthenes produces alkylated aromatics which must be dealkylated to produce benzene. It is highly desirable to be able to produce benzene, in response to demand, from naphthenes having both 6 and more than 6 carbon atoms per molecule by a process which is direct and simple both in conversion and separation steps.

An object of this invention is to produce benzene from naphthenes with sufficient utilization of energy and materials.

On object of this inventoin is to produce benzene from naphthenes in a two step process without intermediate separation.

Other aspects, objects and the advantages of our invention are apparent in the written description, the drawing and the claims.

According to our invention a naphthene concentrate having 6 to about 9 carbon atoms per molecule is first catalytically reformed. The effluent, without separation of hydrogen, is heated and charged to a thermal hydrodealkylation zone in which alkyl benzenes are hydrodealkylated to produce additional quantities of benzene. A stream containing a naphthene having 6 to about 9 carbon atoms per molecule is passed into a reforming zone, and there contacted with a reforming catalyst under conditions of temperature and pressure to produce aromatics. The effluent, containing some alkyl aromatics is passed directly from the reforming zone to a thermal hydrodealkylation zone without separation of hydrogen and, in the hydrodealkylation zone subjected to conditions of temperature and pressure to convert at least a portion of the alkyl aromatics to benzene. The effluent from the hydrodealkylation zone is passed to a separation zone where it is separated into a benzene product stream, an unconverted alkyl aromatic stream, a heavy end stream and a hydrogen stream. A portion of the hydrogen is recycled to the feed. Unconverted alkyl aromatics can be recycled to the feed to the hydrodealkylation zone, in which case a portion of the recycle hydrogen can be fed at this point.

The drawing illustrates schematically a specific embodiment of our invention. An inlet conduit 10 communicates with heater 11, the outlet of which communicates with a reforming vessel 13 through conduit 12. The outlet of vessel 13 communicates with a second heater 15 through conduit 14 and and then through conduit 16 with hydrodealkylation unit 17. This unit in turn discharges through conduit 18 to a separation unit 19. This unit is provided with outlets 20, 21, 22, 23 and 24 for hydrogen, light hydrocarbons, benzene products, unconverted alkyl aromatics and heavy ends, respectively. A recycle line 25 is provided for the unconverted alkyl aromatics and a recycle line 26 for hydrogen. Line 26 is connected to inlet conduit 10 and, through conduit 27, with the inlet to hydrodealkylation unit 17.

In operation a mixed $C_6$-$C_9$ naphthene concentrate is prepared in a conventional manner such as by fractionation, solvent extraction, extractive or azeotropic distillation or combinations of these, whereby a hydrocarbon stream containing 50 to 100 volume percent, preferably 75 to 95 volume percent, of these naphthenes is produced. This stream is conducted under pressure through conduit 10, with hydrogen added through conduit 26, to heater 11, where the mixture is heated to reaction temperature. The hot reaction mixture is then conducted through conduit 12 to the reforming (dehydrogenation) zone in unit 13, where naphthenes are converted to aromatics by dehydrogenation. The reforming zone is operated at pressures in the range of about 250–700 p.s.i.g., preferably 300–600 p.s.i.g., thus assuring sufficient pressure in the downstream portion of the plant. The temperature of operation depends on the particular catalyst used in the reforming zone, numerous satalysts being known. Broadly, temperature in the range of 750 to 1000° F. can be used, the temperature usually being in the range of 750–900° F. with platinum catalyst and in the range of 850–1000° F. with molybdenum oxide-alumina catalyst. The exact conditions of flow rate, temperature and pressure depend upon the particular catalyst used and are adjusted in each case to produce high once-through-yields of aromatics, usually 85 percent or more of the theoretical yield from the naphthenes. Since reforming is endothermic, the reaction can be carried out in several stages with intermediate reheating if desired.

The aromatized effluent is removed through conduit 14, heated in heater 15 to 1100–1500° F., preferably 1200–1400° F., and transferred through conduit 16 to the thermal hydrodealkylation zone in unit 17. The pressure in this zone is lower than that of the reforming zone by the amount of pressure drop between the two zones. This pressure drop is maintained at the minimum practical value since elevated pressure favors hydrodealkylation. In the hydrodealkylation zone alkyl aromatics are converted to benzene. The effluent from this zone is removed through conduit 18 to the separation zone in unit 19, wherein conventional separation practices are employed. Hydrogen is removed through conduit 20, any excess removed to suitable use, and the remainder recycled through conduit 26. Light hydrocarbons are removed through outlet 21 and can be processed in a vapor recovery system to separate and recover the various fractions. Benzene is removed as a product through line 22. Since complete conversion of alkyl aromatics to benzene is not practical, unconverted alkyl aromatics are removed through outlet 23, and all or any desired part can be recycled to the hydrodealkylation zone through conduit 25 and added to the reformer effluent stream in conduit 18. Heavy ends are removed through line 24. Hydrogen is produced in the reforming zone in the proportion of about 3 moles for each mole of naphthene dehydrogenated, though minor side reactions cause some variation in practice from this theoretical value. This amount, along with the hydrogen charged to the reforming zone in the feed, results in a larger amount of hydrogen in the hydrodealkylation zone feed, which is advantageous in this zone. Since the hydrodealkylation reaction consumes 1 mole of hydrogen for 1 mole of monoalkyl aromatic converted, more hydrogen is produced in the reforming zone than is consumed in subsequent conversions in the dealkylation zone. Thus no outside source of hydrogen is required, and precise control of each conversion is possible with the decided advantage of maximum yields in each step.

Although in many installations no hydrogen need be added to the reformer effluent, high ratios of hydrogen in the hydrodealkylation zone can be maintained when recycling unconverted alkyl aromatics by recycling a portion of the hydrogen through conduit 27. Since there is a net production of hydrogen in the process, such control is possible without reliance upon an outside source.

The combination process described above is advantageously applied to the production of benzene from streams containing $C_7$ and higher naphthenes in concentrated form. The presence of the $C_6$ naphthenes is not necessary, but inclusion in the feed produces more benzene without the necessity of a separate conversion. Although benzene is formed from the $C_6$ naphthenes in the reformer and is not further converted in the hydrodealkylation zone, its presence in the hydrodealkylation feed is advantageous because it acts as a heat sink for the exothermic heat of reaction in that zone and facilitates temperature control.

As an example of the operation of our invention a feed mixture of $C_6$–$C_9$ naphthenes containing 3 moles of hydrogen per each mole of hydrocarbon is passed through a reformer containing a platinum-fluorine-alumina catalyst at a temperature of 790° F. and 400 p.s.i.g. The effluent is heated to 1200° F. and is thermally hydrodealkylated without any intermediate separation. The overall yield of benzene is about 80 percent of the theoretical yield from the naphthenes.

In the practice of our invention conventional reforming catalyst and conditions are used. This step can be operated as a fluidized bed or a fixed bed process. Suitable catalysts include a number of oxides or sulfides of metal of groups IV, V, VI and VIII of the periodic system and precious metal catalysts such as platinum or palladium. Conventional reformer catalysts include group VI metal oxides such as molybdenum oxide and chromium oxide supported on activated alumina. The precious metal catalysts also can be supported on alumina and in either case the catalyst may have associated therewith a relatively small amount of fluoride.

The hydrodealkylation reaction is carried out using conventional furnaces and reaction vessels. Suitable conditions for the reaction are as follows:

| Variable | Broad | Preferred |
| --- | --- | --- |
| Temperature, °F | 1100-1500 | 1200-1400 |
| Contact time, sec | 1-150 | 2-100 |
| Pressure, p.s.i.g | 50-1000 | 100-600 |
| $H_2$/HC, mol | 1-20 | 1.5-10 |

The variables of temperature, pressure and hydrogen concentration are controlled along with reaction time to effect the desired depth of conversion. The reaction is exothermic and temperature increases in the direction of flow of the reactants in an adiabatic reaction zone. The average reaction temperature is within the range given, although the maximum temperature can be outside these ranges.

Reasonable variation and modification are possible within the scope of our invention which sets forth process and apparatus for the production of benzene from naphthenes by first catalytically reforming and, without separation of hydrogen, heating and charging the effluent directly to a thermal hydrodealkylation zone in which alkyl aromatics are hydrodealkylated to produce further quantities of benzene.

We claim:

1. A process for producing benzene comprising the steps of preparing a stream comprising 75 to 95 volume percent of cycloparaffins of 6 to about 9 carbon atoms per molecule, passing said stream to a reforming zone, in said reforming zone contacting said stream with a reforming catalyst, at a pressure in the range of about 250–700 p.s.i.g. and a temperature in the range of about 750–1000° F., thereby converting at least a portion of said cycloparaffins to alkyl aromatics, passing the effluent from said reforming zone directly to a thermal hydrodealkylation zone without separation of hydrogen therefrom, subjecting said effluent in said hydrodealkylation zone to a temperature in the range of about 1100–1500° F., thereby converting at least a portion of said alkyl aromatics to benzene, passing the effluent from said hydrodealkylation zone to a separation zone, in said separation zone separating effluent from said hydrodealkylation zone into a benzene product stream, an unconverted alkyl aromatic stream, a heavy ends stream and a hydrogen stream and recycling a portion of said hydrogen stream.

2. A process for producing benzene comprising the steps of preparing a concentrate of 75 to 95 volume percent of naphthenes having 6 to about 9 carbon atoms per molecule, passing said concentrate to a reforming zone, in said reforming zone contacting said stream with a platinum containing reforming catalyst at a pressure in the range of 300–600 p.s.i.g. and a temperature in the range of 750–900° F. for a time sufficient to produce a once-through yield of aromatics of about 85 percent or more of the theoretical yield from the naphthenes, said aromatics comprising alkyl aromatics, passing the entire effluent from said reforming zone directly without separation to a thermal hydrodealkylation zone, subjecting said effluent in said hydrodealkylation zone to a temperature in the range of 1200–1500° F. for a time sufficient to convert a substantial portion of said alkyl aromatics to benzene, passing the effluent from said hydrodealkylation zone to a separation zone, in said separation zone separating said effluent from said hydrodealkylation zone into a benzene product stream, an unconverted alkyl aromatic stream, a heavy ends stream and a hydrogen stream, and recycling a portion of said hydrogen stream and said unconverted alkyl aromatics stream to the inlet of said hydrodealkylation zone.

3. A process for producing benzene comprising the steps of preparing a concentrate of 75 to 95 volume percent naphthenes having 6 to about 9 carbon atoms per molecule, passing said concentrate to a reforming zone, in said reforming zone contacting said stream with a molybdenum oxide-alumina reforming catalyst at a pressure in the range of 300–600 p.s.i.g. and a temperature in the range of 850–1000° F. for a time sufficient to produce a once-through yield of aromatics of about 85 percent or more of the theoretical yield from the naphthenes, said aromatics comprising alkyl aromatics, passing the entire effluent from said reforming zone directly without separation to a thermal hydrodealkylation zone, subjecting said effluent in said hydrodealkylaiton zone to a temperature in the range of 1200–1500° F. for a time sufficient to convert a substantial portion of said alkyl aromatics to benzene, passing the effluent from said hydrodealkylation zone to a separation zone, in said separation zone separating said effluent from said hydrodealkylation zone into a benzene product stream, an unconverted alkyl aromatic stream, a heavy ends stream and a hydrogen stream, recycling a portion of said hydrogen stream and said unconverted alkyl aromatics stream to the inlet of said hydrodealkylation zone.

(References on following page)

References Cited by the Examiner

UNITED STATES PATENTS

| | | | |
|---|---|---|---|
| 2,431,515 | 11/1947 | Shepardson | 260—672 |
| 2,573,149 | 10/1951 | Kassel | 208—65 |
| 2,596,145 | 5/1952 | Grote | 208—65 |
| 3,027,413 | 3/1962 | Moy et al. | 260—672 |

FOREIGN PATENTS 825,268  12/1959  Great Britain.

DANIEL E. WYMAN, *Primary Examiner.*

ALPHONSO D. SULLIVAN, *Examiner.*

J. E. DEMPSEY, *Assistant Examiner.*